United States Patent [19]
Hoots et al.

[11] Patent Number: 4,783,314
[45] Date of Patent: Nov. 8, 1988

[54] FLUORESCENT TRACERS - CHEMICAL TREATMENT MONITORS

[75] Inventors: John E. Hoots, Naperville; Barry E. Hunt, Aurora, both of Ill.

[73] Assignee: Nalco Chemical Company, Naperville, Ill.

[21] Appl. No.: 19,454

[22] Filed: Feb. 26, 1987

[51] Int. Cl.$^4$ ............................................. G01N 21/64
[52] U.S. Cl. ........................................ 422/3; 210/709; 210/745; 422/15; 422/62; 436/55
[58] Field of Search .............................. 422/3, 15-19; 436/55, 172, 27, 56, 38; 210/709, 745

[56] References Cited

U.S. PATENT DOCUMENTS

| | | | |
|---|---|---|---|
| 4,423,152 | 12/1983 | Lewis et al. | 436/56 |
| 4,472,354 | 9/1984 | Passell et al. | 436/38 |
| 4,478,941 | 10/1984 | Hillshafer | 436/56 |
| 4,659,676 | 4/1987 | Rhyne, Jr. | 436/56 |

FOREIGN PATENT DOCUMENTS

62306 10/1982 European Pat. Off. ............... 422/3

Primary Examiner—Michael S. Marcus
Attorney, Agent, or Firm—Kinzer, Plyer, Dorn, McEachran & Jambor

[57] ABSTRACT

A method to determine performance of a treating agent (CA) added to a system body of liquid to enhance performance of the liquid body is determined by employing an inert fluorescent tracer (T) in a known T:CA dosage proportion, prepared on the basis of a concentration of CA (e.g. ppm) proposed for optimum performance in the liquid body. The system liquid is sampled and, on the basis of fluorescent emission, the sampled indicator is compared to a standard ppm concentration of T to determine the concentration and efficacy of CA and the physical characteristics and operating parameters of the liquid body.

18 Claims, 3 Drawing Sheets

FLUORESCENT TRACERS - CHEMICAL TREATMENT MONITORS

FIELD OF THE INVENTION

The present invention pertains to the utilization of compositions containing fluorescent agent(s) and particularly a method of utilizing the same to quantify and control feed rate(s) of treatment chemicals into liquid-containing systems. In addition, the fluorescent agent(s) provide a means of determining composition performance under static or changing operating conditions of the systems. Further, fluorescent agent(s) are used to quantify important characteristics of the system such as total volume and amount of a liquid entering and leaving the system.

The singular form of terms such as agent, tracer, level, rate, component, compound, composition, treatment, formulation, liquid, fluid, and system will be used and are understood to describe both singular and multiple usage. The term liquid is entirely general and may be associated with aqueous, non-aqueous, and mixed aqueous/non-aqueous environments.

BACKGROUND OF THE INVENTION

In a system involving a body of liquid to which a treating agent is added, maintaining the proper feed level for the agent is essential for optimal performance. Improper feed rate of treating agent can lead to serious problems. For example, severe corrosion and/or deposit formation can rapidly occur on heat-exchange surfaces in cooling and boiler water systems when incorrect level of treating agent is used. One common method of estimating the concentration of a treating agent focuses on measuring the level of an active component in the treatment formulation (e.g. polymeric scale inhibitor, phosphate, or organophosphonate). That technique is often unsatisfactory due to one or more of the following problems:

background interferences from the system liquid or materials contained in the liquid;
analytical methods use bulky and costly equipment;
time-consuming, labor-intensive analyses are not compatible with continuous monitoring;
inaccurate readings result from degradation or deposition of active component within the system.

An alternative method of determining treatment feed rates is to specifically add metal ions (e.g. $Li^+$) to the formulation or system. That method helps circumvent the degradation/deposition and background interference problems. However, quantitation of low tracer levels commonly magnifies problems associated with expensive equipment and time-consuming test methods. Additional factors which must be considered are cost and environmental acceptability of the tracer. For example, radioactive tracers are detectable at very low levels, but are generally expensive and unacceptable due to environmental and health concerns.

DESCRIPTION OF THE INVENTION

It is an object of the present invention to avoid all of the aforementioned problems and interferences by incorporating a fluorescent compound as a tracer into a treatment formulation to provide quantitative measurement/control of treatment feed rate and performance. By its very nature, fluorescence is a powerful and selective trace analysis technique, [refer to J. R. Lakowicz; "Principles of Fluorescence Spectroscopy" (1983)].

Figure 1:
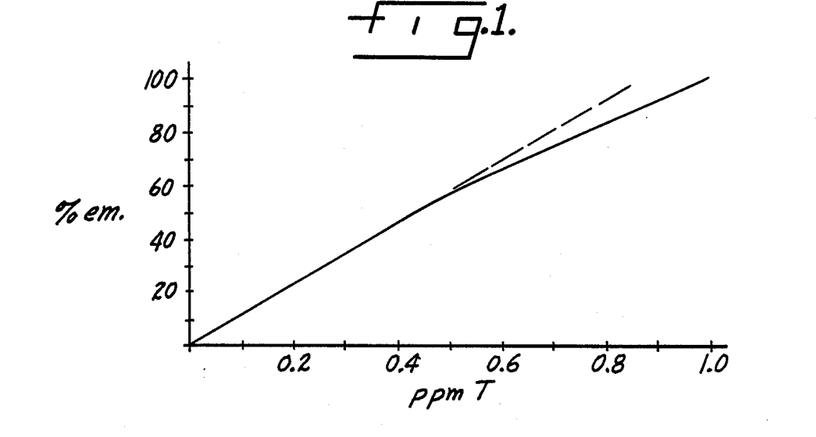
FIG. 1 is calibration curve of fluorescein tracer concentration vs. fluorescent emission level.

In general, the concentration of a fluorescent tracer is directly determined from a calibration curve of tracer concentration versus emission (FIG. 1). That comparison permits the determination of the concentration range over which linear emission response is observed. At higher tracer concentrations, a negative deviation from ideal behavior is observed. The concentration of the tracer can still be determined directly from the calibration curve or the sample can simply be diluted until the tracer concentration falls within the linear emission response range. For extremely dilute samples, techniques exist for increasing the concentration of the fluorescent tracer (e.g. liquid-liquid extraction) until it lies within a desirable concentration range.

By properly choosing the fluorescing reagent, quantitative and in-situ measurement of tracer levels from parts per trillion (ppt) to parts per million (ppm) can be routinely accomplished on an instant or continuous basis with inexpensive portable equipment. In addition, multiple tracers may be used concurrently by choice of tracers with proper spectral characteristics. As such, various combinations of fluorescent tracers and treatment feeds can be quantified within a liquid system. For example, four individual treatments containing a single unique fluorescent tracer plus one additional treatment containing the two fluorescent tracers could be employed within a liquid system. In that case, each fluorescent tracer and the corresponding individual concentration of the five treatments can each be quantified. In addition to being able to quantify complex combinations of the treatment feeds, fluorescent compounds are available which environmentally acceptable, are not degraded by or deposited within the liquid systems, and are available at low cost.

The invention can generally be applied in the following ways:
(a) direct addition of from one or more fluorescent tracers to a liquid system;
(b) incorporation of one to six (or even more) fluorescent tracers into chemical treatment composition containing other components and said treatment is applied to liquid system in order to maintain proper operation of that system;
(c) addition of one to six chemical treatment agents (or even more) containing fluorescent tracer(s)

directly into liquid system or into liquid feed leading into system;
(d) addition of fluorescent tracers so that within the liquid system individual tracer concentrations ranging from 1 part per trillion to 100 parts per million (ppm), preferably from 1 part per billion (ppb) to 10 ppm, and most preferably from 10 ppb to 2 ppm are realized.

The invention can be utilized in a broad range of aqueous, mixed aqueous/non-aqueous, or non-aqueous liquid systems (e.g. boilers, clarifiers, waste treatment, liquid-solid separations, down-hole oil field applications, etc.) where the level of chemical treating agent affects performance of the system.

Two systems have been extensively evaluated:
(1) pilot cooling towers (FIG. 2) used to simulate industrial systems;
(2) field testing in an open-recirculating cooling water system of an industrial plant.

The important differences between the pilot cooling tower (PCT) and industrial cooling water systems are that the latter are more complex with multiple water flow pathways through heat-exchangers, multiple sources of makeup and blowdown water and larger variations in operating control ranges (e.g. concentration of hardness ions, temperature, water quality, pH, etc.).

In all systems, energy is extracted by the recirculating cooling water from the process-side of the system which is at a higher temperature. To maintain the efficiency of that heat transfer, energy is removed by evaporative cooling of the recirculating water in the cooling tower and the heat-exchanger surfaces need to remain clean. Evaporation (E) of the cooling water leads to concentration of the suspended and dissolved solids in the cooling system. The term concentration ratio (CR) is a measure of the increased level of dissolved and suspended matter in a system (eq 1).

$$CR = \frac{\text{concentration of salts in cooling water}}{\text{concentration of salts in makeup water}} \quad \text{(eq 1)}$$

Deposition of solids and corrosion of heat-exchanger surfaces are the problems most generally encountered. Cooling water systems commonly contain highly supersaturated levels of scaling salts and deposition of solids throughout the system (particularly at metal heat-exchangers) will occur unless chemical treatment(s) containing scale inhibitors is added. To prevent corrosion of metal heat-exchangers and water transfer lines, chemical treatment(s) commonly contains corrosion inhibitors. If the feed rate of the chemical treatment is too high or too low, severe scaling and corrosion can occur on the heat-exchangers and throughout the system.

It is vital that the level of dissolved and suspended solids, total volume of system's liquid ($V_T$) and concentration of chemical treatment be maintained between certain values in order to provide economical usage of water, efficient heat transfer, minimal fouling of entire cooling system, and low operating costs. To maintain the concentration ratio (CR) within an acceptable range, water containing a "high" concentration of impurity must be removed from the system [collectively defined as "blowdown" (B)] and replaced by water containing a "low" concentration of impurities [collectively defined as "makeup" (M)]. The values for E, B, M, and CR are variable due to changes in the weather, operating conditions of the industrial plant, and quality of the makeup water. Those factors are all interrelated (as shown below) and a change in any one of those factors must be counterbalanced by corresponding changes in other operating parameters.

$$B + M = E \quad \text{(eq 2)}$$

$$CR = M/B \quad \text{(eq 3)}$$

In addition to the dynamic operating conditions of a cooling water system, other significant variables and unknown factors are commonly encountered. For example, blowdown water (B) can be removed from the cooling system through a variety of ways (eq 4), which unfortunately tend to be variable and ill-defined in nature. The rate at which water is specifically pumped from the cooling water system is defined as "recirculating water blowdown" ($B_R$), and even that rate is not always accurately known due to practical difficulties in measuring large volumes of water. In addition, ill-defined amounts of recirculating water (un-accounted system losses) are commonly removed from the cooling water system to be used in other areas of the industrial plant, defined as "plant blowdown" ($B_P$). Leakage of recirculating water ($B_L$) and drift of liquid droplets from cooling tower ($B_D$) also add to unaccounted system losses. A similar situation can occur with the makeup water, where the total makeup water rate (M) is the combined rate at which makeup water is specifically pumped into the recirculating system ($M_R$) and liquid originating from other sources ($M'$). The complexity of the situation can be appreciated by considering equations 2-5.

$$B = B_R + B_P + B_L + B_D \quad \text{(eq 4)}$$

$$M = M_R + M' \quad \text{(eq 5)}$$

The feed rate of chemical treatment into the cooling water system is commonly based on estimated values for $M_R$ or $B_R$, which means there can be considerable uncertainty regarding the concentration of the chemical treatment. When operating conditions of the cooling water system change, the feed rate of the chemical treatment should be adjusted. Those adjustments may or may not be made, depending on how carefully the cooling water system is monitored and controlled. Even when feed rates are adjusted, the concentration of chemical treatment within a cooling water system generally may respond slowly to the change (eq 6).

$$t = (V_T/B) \ln(2) \quad \text{(eq 6)}$$

where t=response time for 50% of concentration increase to occur.

For example, consider a representative system containing one million gallons and total blowdown rate of 300 gal/min. If the treatment feed rate is increased from 50 to 100 ppm, 38.5 hours are required for only half of that change (25 ppm increase in treatment concentration) to be attained, assuming that no other fluctuations or changes have occurred within the system. For very large values of $V_T$ and small values of B, response time may be measured in days or weeks. In other cases, changes can occur rapidly, such as purposeful (or inadvertent) flushing of the system. Therefore, it is important that good control and accurate monitoring of the system be maintained.

Another significant operating parameter which should be quantified is holding time index (HTI), a measurement of the half-life of a chemical species within the system (eq 7).

$$HTI = 0.693 \, (V_T/B) \qquad \text{(eq 7)}$$

Under severe operating conditions, it is important to optimize HTI in order to reduce possible degradation of components in the chemical treatment without greatly increasing operating costs.

Due to all the operating limitations and uncertainties in cooling water systems, the need to rapidly determine and continuously monitor the concentration of chemical treatments is clearcut. The addition of a fluorescent tracer to the chemical treatment permits accurate detemination of all the unknown, imprecisely known and variable operating conditions previously described.

Figure 3:
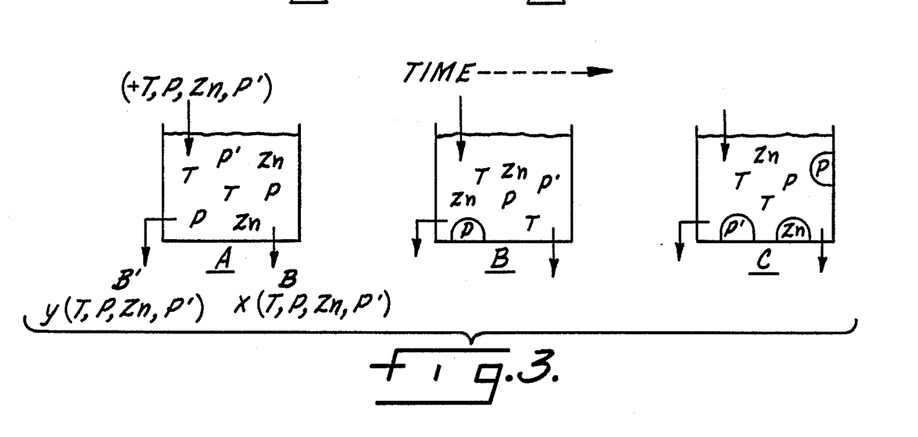
FIG. 3 is molecular representation of fluorescent tracer used to accurately measure treatment concentration.

FIGS. 3A–C demonstrate the operation of the water treatment program at the molecular level as a function of time. The concentrated chemical treatment (which contains one or more components) is slowly fed into the recirculating cooling water where the treatment is rapidly diluted and distributed throughout the system. If operating conditions of the cooling water system remained constant, the addition and removal of treatment (due to recirculating water blowdown and system losses) would equilibrate (FIG. 3A). The concentration of the chemical treatment and its components ideally should remain unchanged. However, that situation never occurs. As time progresses (FIGS. 3B–C), additional amounts of the $Zn^{+2}$, polymer, and phosphorus-containing compounds can be lost from the recirculating water due to deposition and protective-film formation on metal surfaces and chemical/biological degradation processes. Also, changes in operating conditions (blowdown rate, concentration ratio, and product feed rate, and others) affects the concentration of the treatment components. Without a fluorescent tracer, analysis of the recirculating water may measure current concentrations of some of the treatment components (assuming an analysis method exists), but cannot directly indicate the original feed rate of the treatment program. Use of a fluorescent tracer to quantify and control the treatment feed rate is a valuable, if not essential, addition to current water treatment programs.

FIGS. 3A–C also indicate how addition of an inert fluorescent tracer can provide accurate determination of treatment feed rate and treatment efficacy, in spite of deposition of other components in the chemical treatment. For example, assume the formulation feed rate was 100 ppm. If deposition occurred on the heat-exchangers, 40% of the phosphorus-containing species could be lost from the recirculating water, but none of the fluorescent tracer will be lost. The total phosphorus concentration would suggest only 60 ppm of the product was present. However, the fluorescent tracer would correctly indicate the formulation feed rate was 100 ppm and a loss of phosphorus-containing components equivalent to that supplied by 40 ppm feed of formulation was being deposited. Determination of loss rates of active component(s) of the treatment is a direct measurement of treatment efficacy.

In summary, important system characteristics of many industrial systems (total volume, blowdown and makeup rates, holding time index, treatment feed rates and others) are imprecisely known, variable and sometimes unpredictable in nature. Lack of knowledge regarding those factors can lead to serious deposit and corrosion problems throughout the entire cooling water system. In particular, over/underfeeding of treatment program or improper operation of cooling water system can result in significant loss of treatment component(s) and adversely affect heat transfer within a cooling water system. In addition, water treatment programs commonly contain regulated or toxic materials (e.g. zinc ions, phosphate, or chromate). Overfeeding of treatments can be hazardous and makes it more difficult for industrial sites to meet government restrictions on effluent discharges. Use of a fluorescent tracer is a highly desirable means of accurately determining, continuously monitoring, and controlling cooling water system characteristics and treatment feed rates within desirable ranges.

The successful use of a fluorescent tracer to accomplish the tasks described above has been accomplished in several systems. Pilot cooling tower tests (example 1) have clearly demonstrated the concept and feasibility of using fluorescent tracers in treatment formulations and field testing has proven applicability of fluorescent tracers in real-world systems (example 2).

EXAMPLE 1

Treatment Efficacy and Scaling Rate Determination
(Pilot Cooling Test)

Tests were conducted in pilot cooling towers (FIG. 2) which are designed to simulate an industrial cooling water system. Processes such as recirculating water, chemical treatment feed, deposit formation and corrosion on heat-exchangers, blowdown and makeup, and evaporative cooling from tower fill are all included. A significant feature of this laboratory system is that fluorescent tracer determination of system volume and treatment feed rates can be verified by alternative direct measurements.

Figure 4:
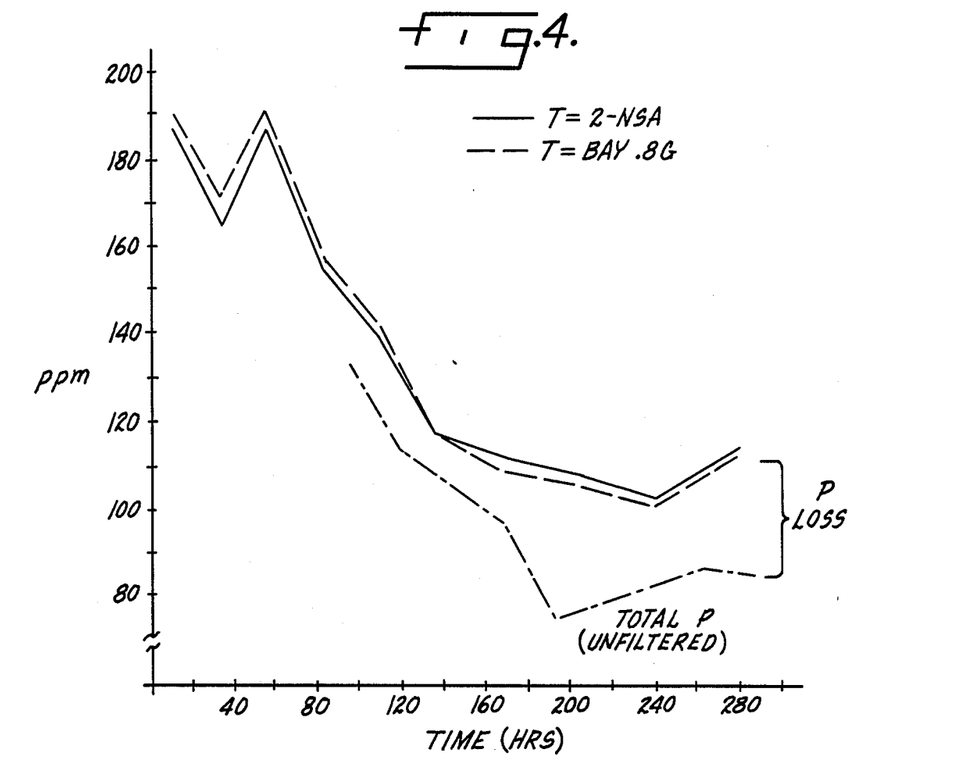
FIG. 4 is performance comparison of dual fluorescent tracers vs. phosphorus analysis for product feed rate determination in pilot cooling tower.
Figure 5:
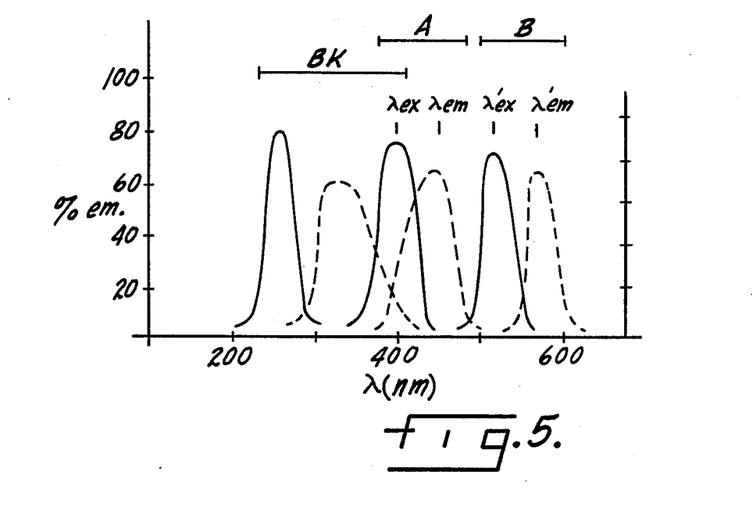
FIG. 5 is set of curves demonstrating that proper choice of analysis conditions allows determination of the concentration of more than one fluorescent tracer and circumvents interfering agents.

Results from a PCT test are summarized in FIG. 4. A single water treatment formulation was used and contained two fluorescent tracers (sodium salt of 2-naphthalenesulfonic acid and Acid Yellow 7 dye, Bay 0.8G), a polymer (scale inhibitor), organophosphorus compounds (scale and corrosion inhibitors), and aryltriazole (corrosion inhibitor for brass). The concentration of each fluorescent tracer was quantified and compared to the total phosphorus concentration in the system's recirculating water. The total phosphorus content was determined by persulfate oxidation of organophosphorus species to orthophosphate and subsequent formation of blue phosphomolybdate complex which was quantified spectrophotometrically [refer to M. C. Rand; "Standard Methods for the Examination of Water and Wastewater," 14th Ed. (1975)]. Each fluorescent tracer was quantified individually by choosing widely separated wavelengths of light to excite the individual tracer and by observing fluorescent emission at widely separated wave-lengths of light for each tracer (FIG. 5). A dilute solution (100 ppm) of treatment was used as a reference standard and all concentrations of tracers and phosphorus-containing species (total phosphorus content) are expressed as an equivalent formulation concentration.

The aryltriazole corrosion inhibitor in the formulation described above is fluorescent. However, proper choice of the wavelenghts of light for excitation and observation of fluorescent emission of the 2-naphthalenesulfonic acid (2-NSA) and Acid Yellow 7 tracers circumvented potential interference by the aryltriazole. The underlying principles regarding quantitation of individual fluorescent tracers and avoiding interference from other fluorescent compounds are shown in FIG. 5.

The specific purposes of this pilot cooling tower test are as follows:
- to demonstrate that a fluorescent tracer can accurately determine total system volume and treatment feed rate;
- to prove two or more fluorescent tracers can be individually quantified;
- to show that fluorescent tracers can be quantified in the presence of other fluorescent compound(s);
- to prove fluorescent tracers are superior to other currently used methods for determining treatment feed rates (e.g. total phosphorus concentration);
- to measure the difference between fluorescent tracer readings and other active component(s) of the treatment and demonstrate the loss of active component(s) and overall treatment efficacy can be quantified.

Each of the previous goals was successfully accomplished in the pilot cooling tower test (refer to FIG. 4). The PCT system was initially dosed with 192 ppm of formulation based on a total system volume of 52 liters. Initial tracer readings of Acid Yellow 7 and 2-NSA indicate 190 ppm and 186 ppm of treatment were slugged into the PCT system, which would respectively correspond to system volume values of 52.5 and 53.1 liters. The tracer results were internally consistent and provided an accurate measure of the system volume.

During the PCT's first 40 hours of operation, the blowdown pump was off and the recirculating water was being concentrated by evaporation from a concentration ratio of one (makeup water) up to a value of four (refer to eq. 1). During that time, drift from the cooling tower is the only loss of recirculating water from the system and should cause a small and equal decline in the level of each fluorescent tracer. That response is precisely what was observed. Between 40-48 hours, the blowdown of recirculating water was used to maintain a constant concentration ratio and the treatment was fed into system at a rate of 213 ppm whenever blowdown occurred. As such, a small and equal increase in the concentration of each fluorescent tracer should be observed during that time period, which was the case. Between 48 hours and completion of the test, treatment was fed at an average rate of 112 ppm whenever blowdown of the system occurred. During that time, the level of each tracer should undergo an equal and exponential decrease (refer to equation 6) and finally level off at a concentration approaching 112 ppm after ~190 hours. From 190 hours until the end of the test, the concentration of each tracer may undergo small and equal increases or decreases in response to small variations in the PCT operating conditions (e.g. changes in blowdown rate, concentration ratio, etc.). That predicted behavior for each fluorescent tracer was exactly what was observed throughout the entire PCT test (FIG. 4).

Comparison of the treatment feed rate in the recirculating water predicted by the fluorescent tracer levels versus total water predicted by the fluorescent tracer levels versus total phosphorus concentration demonstrates the superior accuracy of the fluorescent tracers and their ability to determine treatment efficacy. After 190 hours, the total phosphorus level indicated a treatment concentration of 75-86 ppm, whereas the fluorescent tracer indicated the treatment level was averaging 110 ppm. The differences in those levels arise from deposition of the organophosphorus components of the treatment onto the heat-exchanger tubes. The difference(s) between the fluorescent tracer level(s) and the total phosphorus level is a direct measure of treatment effectiveness, since it quantifies how much of the active phosphorus-containing components are being lost within the system from deposition and corrosion processes. In an "ideal" operating system, the total phosphorus and fluorescent tracer levels would all indicate an identical treatment concentration.

Upon completion of the PCT test, the solid deposits from the heat-exchange tube were removed and analyzed. A high rate of deposit formation was measured (54 mg/day), whereas 35 mg/day was considered to be the maximum acceptable limit. The total phosphorus content of the deposit was 10.4 wt % (as orthophosphate) and is consistent with deposition of the organophosphorus-containing treatment components, as previously described. In spite of the high scaling rate, no detectable amount (<0.003 wt %) of either Acid Yellow 7 or 2-NSA was observed, which verifies the inert and non-adsorbing nature of those fluorescent tracers.

EXAMPLE 2

Industrial Cooling Tower (Field Trial)

In the field test, the industrial system was being operated under severe conditions as follows:
- total system volume was imprecisely known and blowdown rate was incorrectly measured;
- long holding-time index and large volume of recirculating water;
- high skin temperatures on heat-exchange tubes;
- low flow of cooling water experienced in some areas;
- moderate level of particulate matter present;
- significant variations in concentration ratio;
- system had not been pretreated to minimize possibility for adsorption of tracer on surfaces and deposits;
- high average flow rate of recirculating water (~100 million gallons/day).

The system investigated was a complicated (but typical) recirculating water system including a cooling tower used to cool high-temperature process-side fluids. However, that cooling tower and system could just as well have been one used with any industrial process in which the energy is extracted by heat-exchange with a moving body of water. There were numerous points for bleedoff or blowdown of recirculating water, and likewise several sources of makeup water was possible.

Initially, a treatment program comprised of a fixed ratio of corrosion inhibitors ($Zn^{+2}$ and inorganic/organic phosphorus compounds), a polymeric scale inhibitor (to prevent deposition of scaling salts and corrosion inhibitors within the system) was fed into the cooling water system. The first treatment did not contain a fluorescent tracer and the rate of treatment feed was based upon a flowmeter reading from the blowdown pump. Analysis of the recirculating water revealed unexpectedly low levels of zinc, phosphorus, and polymer. At that point, it was not known whether the low treatment levels were due to deposition/degradation of the treatment components, poor analytical results, or a low feed rate of treatment. It became essential to quantify the system's operating characteristics and determine if the chemical treatment was functioning properly.

Figure 6:
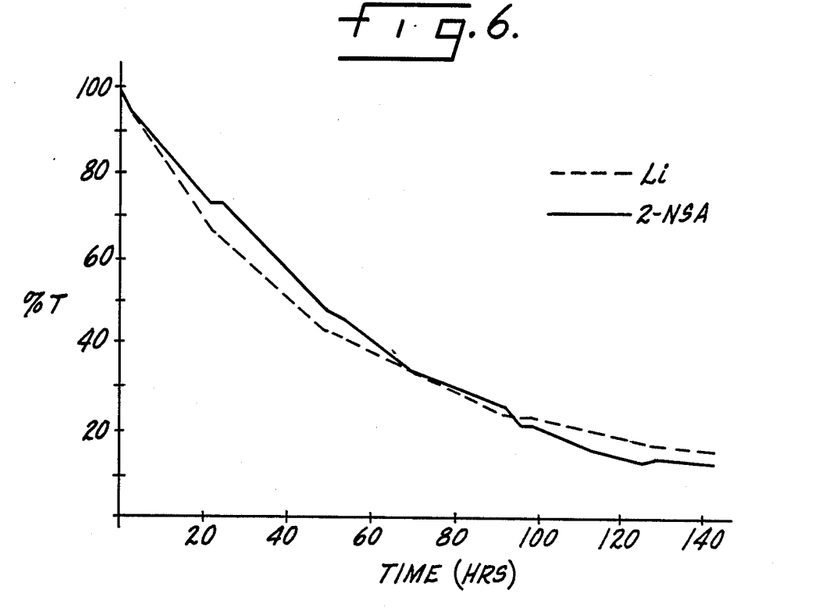
FIG. 6 is performance comparison of fluorescent vs. $Li^+$ tracers in "die-away" study of industrial cooling water system.

To determine the reason(s) for the low levels of chemical treatment components being observed, an inert fluorescent tracer, a sodium salt of 2-naphthalenesulfonic acid (2-NSA) was employed in the following tests:

Test A - "slug-feed and die-away" study using dual tracer combination with known amounts of lithium chloride and fluorescent 2-NSA added to the system (refer to FIG. 6).

Test B—a known amount of 2-NSA was added to the treatment formulation (which was slowly fed into the system) as previously described in example 1.

The 2-NSA fluorescent tracer is inert to the cooling water system in the sense of not being reactive with any other components in the body of water and incapable of coupling or depositing in any manner with the system equipment. Because the fluorescent tracer is capable of remaining as a discrete and unchanged entity which permeates throughout the circulating system, the tracer is a true indicator of treatment feed rate and characteristics of the cooling water system.

The "slug-feed and die-away" studies (Test A, FIG. 6) are classical procedures for determining total removal of recirculating water from system (blowdown-+system leakage+unaccounted system losses+cooling tower drift) and total volume of cooling water system. By adding a known amount of the tracer and measuring its concentration after it has permeated the system, the total system volume can be quantitatively measured. $Li^+$ has been previously used as an inert, non-adsorbing tracer in "slug-feed and die-away" studies. However, lithium is very expensive to use, cannot be monitored continuously and quantitative analysis requires atomic adsorption or emission spectrophotometric equipment, and a significant pre-existing background of lithium is present in some systems. The 2-NSA fluorescent tracer provided comparable results to $Li^+$, but a much smaller amount (one-sixth the mass and 1/30th the cost) of 2-NSA was required as compared to $Li^+$. In addition, quantitative analysis of 2-NSA in a cooling water system (by comparison of fluorescence emission to a reference solution of 2-NSA) is much simpler and rapid than AA analysis of lithium. Furthermore, a significant pre- exisiting background of 2-NSA has not been encountered in industrial application sites. The slug feed of 2-NSA tracer and "die-away" study clearly demonstrated the following facts:

(a) the 2-NSA served as an inert tracer which was not measurably adsorbed by, deposited within, or degraded by the industrial cooling water system under study;

(b) total removal of recirculating water from system was 40% higher than indicated from measurement of a blowdown flowmeter. The difference was traced to previously unaccounted losses of cooling water being used within the plant;

(c) the low concentration of treatment components was a result of low treatment feed rate due to previously unknown losses from cooling water system, not failure of treatment program;

(d) total volume of system (1.6 M gal), total removal of recirculating water (370 gpm), and holding time index (50 hrs) were accurately quantified by 2-NSA and consistent with lithium results.

Use of treatment formulation which also contained 2-NSA fluorescent tracer (Test B) further verified that the formulation was being fed at only ~70% of desired level. Analysis of the $Zn^{+2}$ and phosphorus levels had incorrectly suggested the treatment concentration was even lower than 70% of desired value. Inclusion of 2-NSA in the treatment formulation clearly demonstrated the following:

(a) total removal of recirculating water from system was much higher than indicated by flowmeter on recirculating water blowdown pump;

(b) $Zn^{+2}$ and phosphorus analyses were not being properly conducted, resulting in erroneously low results;

(c) the low levels of treatment components resulted from a low treatment feed rate, not failure of the formulation to function effectively.

Accordingly, the feed rate of the treatment program was increased to compensate for the additional losses of recirculating water from the system.

It can be seen from the previous examples that the use of fluorescent tracer(s) provides essential information regarding the efficient operation of the cooling water system and proper application of the treatment program. That information is particularly vital when unknown operating factors cause discrepancies between "calculated" and observed results.

EXAMPLE 3

Treatment in a Vessel, Pond or Other Chamber

In addition to recirculating cooling water systems, there are numerous examples of industrial systems whereby a chemical treatment is added to a moving liquid in a containment structure(s) and associated transfer lines in order to maintain proper operation of the system. In many cases, the concentration, feed rate and efficacy of the chemical treatment are imprecisely known and system characteristics (total volume, makeup and blowdown rates, holding time index, etc.) are estimated, variable or unknown. The systems can generally be divided into three major classes: closed, open, and once-through. In each case, fluorescent tracers can be effectively used to determine and continuously monitor the concentration and efficacy of chemical treatment and a system's operating conditions and unknown characteristics.

In a "closed" system, the liquid and chemical treatment generally remain within the system and minimal amounts of liquid are added or discharged. Common examples of closed systems are continuous casting processes in the metallurgical industry, refrigerating and air-conditioning units, radiator units, and recirculating cooling water systems in areas where water use or chemical discharges are severely limited. In those systems, the treatment can be lost through chemical/microbial degradation, deposition/corrosion processes, system leaks and low level discharges.

The common characteristics of "open" systems are that variable and significant amounts of liquid (makeup) and chemical treatment are added and discharged (blowdown) from the working fluid. The system may or may not be pressurized and subject to evaporative losses of fluid. Common examples of open systems (in addition to examples #1 and 2) are boilers, gas scrubbers and air washers, municipal sewage treatment, metal working and fabrication processes, paint spray booths, wood pulping and papermaking, and others. Chemical treatment can be lost through system discharges and leaks, deposition/corrosion processes, adsorption onto particulate matter, chemical/microbial degradation, etc.

"Once-through" systems generally involve a fluid and chemical treatment which are added to a system, pass through the system a single time, and then are discharged as effluent or transferred into another system. Much larger amounts of water are required in those systems than in comparable "closed" or "open" recirculating systems. Common examples of once-through systems are clarification and filtration units, mineral washing and benefaction, boilers, and cooling for utilities and industrial process streams.

In each of the above situations, the chemical treatment containing a known quantity of fluorescent tracer is added to and distributed within the liquid system. The liquid can be sampled or continuously monitored at any point of addition, from within the system or its discharge. By comparing fluorescent emission of the system liquid with a standard solution containing a known concentration of chemical treatment +tracer, the concentration of the chemical treatment within the liquid system is determined. In addition, by determining the tracer concentration at different points in the system, the uniformity of chemical treatment distribution and presence of low fluid flow and stagnant regions within the system can be quantified. Based on the results and techniques described in previous sections, the fluorescence level of the liquid allows one to accurately determine many operating parameters (total volume, holding time index, blowdown rate, unaccounted for system losses, chemical treatment efficacy, etc.) within the wide variety of systems listed in this example.

EXAMPLE 4

Treatment in a Vessel, Pond, or Other Chamber (Containing Stagnant and Low Fluid Flow Regions)

Figure 7:
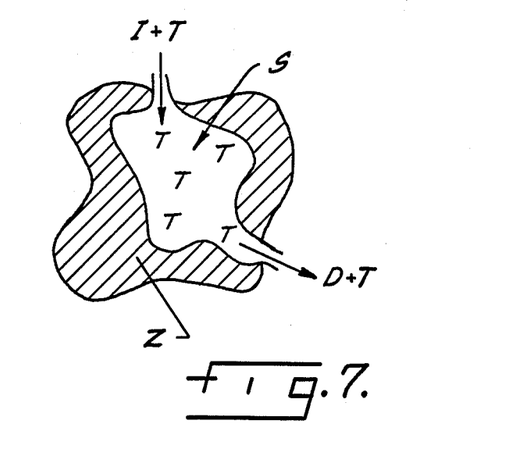
FIG. 7 is use of fluorescent tracer(s) in system with stagnant and low fluid flow regions to determine effective working volume and treatment concentrations.

Stagnant or low fluid flow regions are inherent in some systems, in spite of continued addition and discharge of liquid(s). For example, oil field applications (drilling, secondary and tertiary recovery methods, etc.) involve addition of chemical treatment(s) to a liquid which will permeate slowly into some portions of a larger system. Although the true total volume of that system cannot be accurately determined, the effective working volume and average concentration of the chemical treatment can be quantified by comparing the tracer concentration(s) in the liquid entering and leaving the system (FIG. 7). By comparing the individual concentrations of treatment components and fluorescent tracer, the efficacy and degradation of the treatment and its components can be determined.

FLUORESCENT TRACERS

There are numerous fluorescent tracers which are capable of equivalent performance as substitutes for 2-naphthalenesulfonic acid or Acid Yellow 7, and whose concentration may be quantitatively measured at trace levels ranging from parts per trillion (ppt) to parts per million (ppm). Those fluorescent tracers may be soluble in water, organic solvents, inorganic solvents or mixtures of solvents chosen from one or more of the classes of liquids described. Those tracers may also be chosen from classes of materials which are excited by absorption of light and produce fluorescent light emission, where the excitation and emission light occurs at any point within the far ultraviolet to near infrared spectral regions (wavelengths from 200–800 nm). Combinations of one or more fluorescent tracers may also be used in combination with other fluorescent materials as long as the absorption of excitation light and emission of fluorescent light from the other components does not interfere with detection of light emission from the fluorescent tracers (refer to FIG. 5). Fluorescent tracers may also be used with other chemical agents, inert carriers, and in conjunction with non-fluorescing tracers as previously described.

Some fluorescent materials may possess desirable characteristics which are preferred in certain applications. For example, rapid dissolution in water is desirable for a fluorescent tracer being employed in aqueous systems. However, the concept of using fluorescent tracers to quantitatively measure treatment feed rates and operating characteristics of a performing liquid within a contained system is entirely general. Therefore, any material which is capable of fluorescing while dissolved or present in the performing liquid of a system or a liquid employed during analytical measurement of fluorescent emission may serve as a fluorescent tracer.

Dependability of the fluorescent indicator 2-NSA was verified in two ways. It was compared to a $Li^+$ indicator for accurate response and was found reliable. Also, it was compared to a second indicator and the two indicators gave identical results, within experimental error. The method of using multiple indicators, which also serves to provide an internal standard, provided clearcut confirmation of the accuracy of the results. Indeed, the use of combinations of tracers could be readily utilized as a practical matter under the present invention.

SPECIAL BENEFITS OF USING FLUORESCENT TRACERS

The use of fluorometry to quantitatively measure fluorescent tracers in liquid systems has special advantages compared to other trace analysis techniques as follows:

(a) very good selectivity as only a very small percentage of organic compounds fluoresce to a significant extent;

(b) a sufficient number of compounds are fluorescent so that, for any particular system, a tracer can be chosen for optimal performance (e.g. spectral properties, solubility, chemical inertness, low toxicity, etc.);

(c) tracers can be used in a broad range of organic and inorganic liquid systems ranging from polar solvents (such as water and alcohols) to nonpolar hydrocarbon solvents;

(d) very good selectivity is obtained since two spectral parameters can be varied and optimized (wavelength of light used to excite the tracer and the wavelength of fluorescence emission observed) as indicated in FIG. 5;

(e) proper choice of excitation light wavelength and fluorescent emission wavelengths provides ability to individually quantify one or more tracers, even in the presence of other fluorescent materials (FIG. 5);

(f) exceptional sensitivity with detection limits down to parts per trillion without requiring highly sophisticated equipment;

(g) proper choice of tracers provides very good resistance to changes in fluorescence emission due to operating conditions of system (e.g. pH, temperature, dissolved salts, particulate matter, etc.).

Overall, use of fluorescent tracers offers an exceptional combination of favorable properties, capabilities and ease of use.

In FIG. 1, the solid line represents observed values; the dashed line represents the ideal condition. The vertical axis is % relative emission under excitation. The tracer is symbol T.

Figure 2:
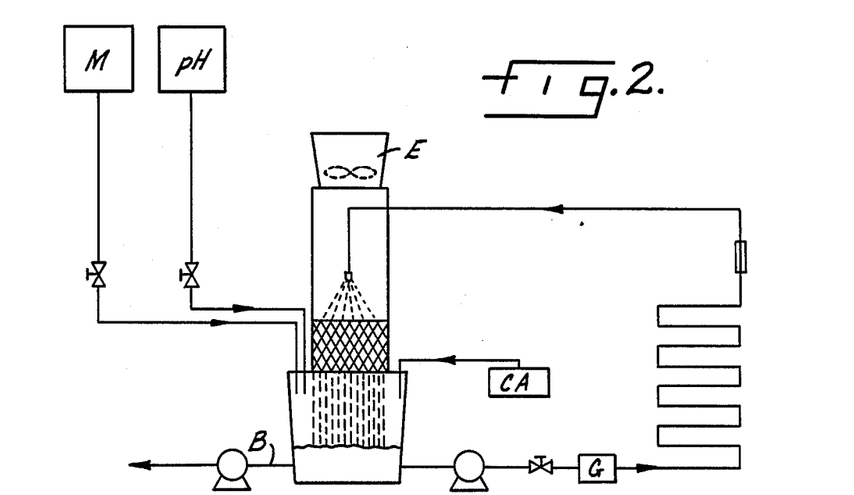
FIG. 2 is schematic view of a representative cooling tower system.

In FIG. 2 most of the alphabet symbols have previously been defined. CA symbolizes treating component or components (e.g. phosphorus compounds, zinc compounds, etc.) and G represents equipment which measures pH and conductivity. Other instrumentation obviously may be present.

In FIG. 3 the treating components (CA) are P, standing for a phosphorus containing compound (e.g. organo-phosphorus compounds as scale and corrosion inhibitors); Zn designating the zinc cation and P' which designates a polymeric scale inhibitor, also one of the treating components. The "capped" symbols represent deposits; x and y are fractional amounts. B' represents the collective unaccounted losses of liquid from the system ($B_P + B_L + B_D$, etc.).

In FIG. 4, P has the same meaning as in FIG. 3 and T has the same meaning as in FIG. 1.

In FIG. 5, the dashed curves are emission spectra, the solid curves are absorbance spectra. The left vertical axis is relative emission (em %) and the right vertical axis represents absorbance, contrasting two fluorescent tracers A and B; BK is background interference. FIG. 5 shows that for selected excitation values (radiant energy; horizontal axis) the emission % for the two tracers in the presence of each other is recognizably different and each is recognizably different from an (otherwise) interfering fluorescent compound (background) which might be present.

FIG. 7 represents Example 4. Here, flow input to the system (S) is represented by character I and flow discharge is D. T is the tracer. The outer solid line is the fluid boundary and area Z stands for a stagnant zone.

We claim:

1. In an industrial or municipal water system involving equipment through which is a moving body of water containing impurities and containing a quantified dosage of a water treating component having the role of being consumed while removing or neutralizing impurities in the body of water, a method of monitoring the system to determine if the level of treating component subscribes to an acceptable parts-component: liquid volume proportion under operating conditions comprising the steps of:
   (A) adding to the body of water a water soluble fluorescent tracer in an amount proportioned to the amount of treating component in the system, the fluorescent tracer being inert to water, inert to the equipment and inert to the treating component;
   (B) withdrawing from the system a sample of the body of water containing both the component and tracer and subjecting the withdrawn sample to an analysis which consists essentially of the step of comparing the tracer concentration thereof to a standard on an emissivity basis to determine the concentration of tracer in the sample; and, if the operating concentration is outside an acceptable operating range,
   (C) changing the volume of water or the dosage of treating component until an acceptable operating range of concentration for the treating component is attained.

2. Method according to claim 1 in which step (B) is a step repeated at different locations in the body of water to analyze performance of the treating component at such different locations.

3. Method according to claim 1 in which the treating component is a scale inhibitor or corrosion inhibitor.

4. Method according to claim 1 in which step (B) is used with the step of conducting a separate quantitative analysis of the treating component level to verify the accuracy of step (B).

5. Method according to claim 1 in which step (B) indicates the need to change both the volume of water and the dosage of treating component and including the step of making both changes.

6. Method according to claim 1 in which the fluorescent tracer is either 2-napthalensulfonic acid or Acid Yellow 7.

7. Method according to claim 1 in which the water system is undergoing clarification resulting in a clarified body of water and in which the treating component is one which removes impurities to produce a clarified body of water.

8. Method according to claim 7 in which the system is an open system having both a flow inlet and flow outlet.

9. Method according to claim 8 in which the liquid body is a stream of water, into and out of a chamber, coupled with water in the chamber containing particulate solids to be removed therefrom, the treating component being one which aids removal of the particulate solids to increase the clarity of effluent water removed from the chamber.

10. Method according to claim 1 in which the system is a water cooling system.

11. Method according to claim 10 in which step (B) identifies an unknown loss or gain of water volume in the water system, and including the step of correspondingly increasing or decreasing the volume of water in the system.

12. Method according to claim 1 in which step (B) indicates a need to alter the dosage of component and including the step of altering that dosage.

13. Method according to claim 12 in which step (B) is repeated to determine the rate at which the system responds to the altered component dosage.

14. Method according to claim 1 including the step of employing at least two different treating components together with at least two different fluroescent tracers, the fluorescent tracers having recognizably different emissivity values, and the fluorescent tracers having emissivity values recognizably different from the emissivity value of any fluorescent background present.

15. Method according to claim 14 in which the fluorescent tracers are 2-napthalensulfonic acid and Acid Yellow 7.

16. Method according to claim 1 in which the system is a cooling water system, including the step of adding both a scale inhibitor and corrosion inhibitor to constitute the treating component.

17. Method according to claim 16 in which step (B) identifies an incorrect dosage of treating component and including the step of altering the dosage of treating component until an acceptable operating range therefore is achieved.

18. Method according to claim 16 in which step (B) identifies the need to correct a water loss in the system or a water gain in the system and including the step of undertaking such correction.

* * * * *